(12) United States Patent
Kazmi et al.

(10) Patent No.: US 8,903,415 B2
(45) Date of Patent: Dec. 2, 2014

(54) USER EQUIPMENT, A POSITIONING NODE AND METHODS THEREIN

(75) Inventors: Muhammad Kazmi, Bromma (SE); Iana Siomina, Solna (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 206 days.

(21) Appl. No.: 13/321,926

(22) PCT Filed: Oct. 11, 2011

(86) PCT No.: PCT/SE2011/051216
§ 371 (c)(1),
(2), (4) Date: Nov. 22, 2011

(87) PCT Pub. No.: WO2012/099517
PCT Pub. Date: Jul. 26, 2012

(65) Prior Publication Data
US 2012/0184302 A1    Jul. 19, 2012

Related U.S. Application Data

(60) Provisional application No. 61/434,193, filed on Jan. 19, 2011.

(51) Int. Cl.
*H04W 24/00*    (2009.01)
*H04W 64/00*    (2009.01)
*H04W 36/00*    (2009.01)
*H04W 40/00*    (2009.01)

(52) U.S. Cl.
CPC ..................................... *H04W 64/00* (2013.01)
USPC ........ 455/456.1; 455/443; 455/444; 455/445; 455/446; 455/447; 455/448

(58) Field of Classification Search
CPC .................................................... H04W 24/00
USPC ............ 455/404.2, 407, 414.1, 414.2, 422.1, 455/423, 425, 456.1, 457, 513–515, 455/524–525, 59–63.1, 67.11–69; 370/233–235, 241, 252–253, 204, 206
See application file for complete search history.

(56) References Cited

U.S. PATENT DOCUMENTS

2010/0317343 A1* 12/2010 Krishnamurthy et al. . 455/435.1
2011/0275385 A1* 11/2011 Escolar-Piedras et al. 455/456.1
(Continued)

OTHER PUBLICATIONS

International Preliminary Report on Patentability and Written Opinion issued in Application No. PCT/SE2011/051216 dated Jul. 23, 2013.

(Continued)

*Primary Examiner* — Huy C Ho
(74) *Attorney, Agent, or Firm* — Nixon & Vanderhye, P.C.

(57) ABSTRACT

Embodiments relate to positioning of a user equipment in a communications network. A method in a user equipment for performing positioning measurement comprises receiving positioning assistance data from a positioning node. The positioning assistance data comprises a plurality of reference cells, wherein each reference cell may be associated with at least one respective frequency, and a set of neighbor cells comprising at least one neighbor cell. The method further comprises, for each reference cell comprised in the plurality of reference cells, identifying a respective associated set of neighbor cells, wherein the reference cell and the respective associated set of neighbor cells define a group. Furthermore, the method comprises performing at least one positioning measurement using the positioning assistance data for each respective identified group.

40 Claims, 8 Drawing Sheets

(56) References Cited

U.S. PATENT DOCUMENTS

2012/0149392 A1 6/2012 Siomina et al.
2013/0059610 A1 3/2013 Siomina et al.

OTHER PUBLICATIONS

International Search Report in corresponding PCT Application No. PCT/SE2011/051216 dated Mar. 29, 2012.

Written Opinion in corresponding PCT Application No. PCT/SE2011/051216 dated Mar. 29, 2012.

"3rd Generation Partnership Project; Technical Specification Group Radio Access Network; Evolved Universal Terrestrial Radio Access (E-UTRA); Requirements for support of radio resource management (Release 10)", Jan. 6, 2011, pp. 1-402.

* cited by examiner

USER EQUIPMENT, A POSITIONING NODE AND METHODS THEREIN

This application is the U.S. national phase of International Application No. PCT/SE2011/051216, filed 11 Oct. 2011, which designated the U.S., and claims the benefit to U.S. Provisional Application No. 61/434,193, filed 19 Jan. 2011, the entire contents of each of which are hereby incorporated by reference.

TECHNICAL FIELD

Embodiments herein relate to a user equipment, a positioning node, and to methods therein. In particular, embodiments herein relates to positioning of the user equipment in a communications network, e.g. in a wireless communication network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies. A radio communications network comprises radio base stations providing radio coverage over at least one respective geographical area forming a cell. User Equipments (UE) are served in the cells by the respective radio base station and are communicating with respective radio base station.

The base station, e.g. a Radio Base Station (RBS), is sometimes referred to as e.g. "eNB", "eNodeB", "NodeB", or BTS (Base Transceiver Station), depending on the technology and terminology used. The base stations may be of different classes such as e.g. macro eNodeB, home eNodeB or pico base station, based on transmission power and thereby also coverage area and cell size. A cell is the geographical area where radio coverage is provided by the base station installed at a base station site and may be equipped with one or more antennas. One base station, situated on the base station site, may serve one or several cells. Further, each base station may support one or several wireless communication technologies. The base stations communicate over the air interface operating on radio frequencies with the user equipments within range of the base stations.

In some Radio Access Networks (RANs), several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

In the context of this disclosure, the expression Downlink (DL) is used for the transmission path from the base station to the mobile station. The expression Uplink (UL) is used for the transmission path in the opposite direction i.e. from the mobile station to the base station.

The possibility of identifying a geographical location of a user equipment in the radio communications network has enabled a large variety of commercial and non-commercial services, e.g., navigation assistance, social networking, location-aware advertising, emergency calls, etc. Different services may have different positioning accuracy requirements imposed by the positioning application. In addition, some regulatory requirements on the positioning accuracy for basic emergency services exist in some countries, e.g. 300 meters in Federal Communications Commission (FCC) Enhanced 911 in United States.

In many environments, the position may be accurately estimated by using positioning methods based on the Global Positioning System (GPS). Nowadays, networks have also often a possibility to assist user equipments in order to improve the terminal receiver sensitivity and GPS start-up performance, e.g. as Assisted-GPS (A-GPS) positioning do. GPS or A-GPS receivers, however, may not necessarily be available in all wireless terminals such as user equipments. Furthermore, GPS is known to often fail in indoor environments and urban canyons. A complementary terrestrial positioning method, called Observed Time Difference of Arrival (OTDOA), has therefore been standardized by 3GPP. In addition to OTDOA, the LTE standard also specifies methods, procedures, and signaling support for Enhanced Cell ID (E-CID) and Assisted-Global Navigation Satellite System (A-GNSS) positioning. Later, Uplink Time Difference of Arrival (UTDOA) may also be standardized for LTE. UTDOA is a real time locating technology that uses multilateration based on timing of received uplink signals. Multilateration is the process of locating an object by accurately computing the Time Difference Of Arrival (TDOA) of a signal emitted from that object to three or more receivers.

The three key network elements in an LTE positioning architecture are a Location Server (LCS) Client, an LCS target device and an LCS Server. The LCS Server is a physical or logical entity managing positioning for the LCS target device by collecting measurements and other location information, assisting the user equipment, e.g. the terminal, in measurements when necessary, and estimating the LCS target location. A LCS Client is a software and/or hardware entity that interacts with a LCS Server for the purpose of obtaining location information for one or more LCS targets, i.e. the entities being positioned. LCS Clients may be in any part of the network, e.g. in a core network node, in a radio base station or in a user equipment. LCS Clients also may or may not reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or the network.

Position calculation may be conducted, for example, by a positioning server, e.g. the LCS server, an Evolved Serving Mobile Location Centre (ESMLC) or a Secure User Plane Location (SUPL) Location Platform (SLP) in LTE, or by a user equipment. The former approach corresponds to the UE-assisted positioning mode, whilst the latter corresponds to the UE-based positioning mode.

Two positioning protocols operating via the radio network exist in LTE; the LTE Positioning Protocol (LPP) and LLP annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between base stations, e.g. the eNodeB, and LCS Server specified mainly for control-plane positioning procedures, but it may also assist user-plane positioning by querying eNodeBs for information and eNodeB measurements. SUPL protocol is used as a transport for LPP in the user plane. LPP also has a possibility to convey LPP extension messages inside LPP messages, e.g. currently Open Mobile Alliance (OMA) LPP extensions (LLPe) are being specified to allow e.g. for operator-specific assistance data or assistance data that cannot be provided with LPP or to support other position reporting formats or new positioning methods.

In a high-level architecture, as it is currently standardized in LTE, the LCS target is a user equipment such as a terminal, and the LCS Server is an E-SMLC or an SLP. In the figure, the control plane positioning protocols with E-SMLC as the terminating point are shown as LCS AP, LPPa, LPP, and the user plane positioning protocol is shown as SUPL and SUPL/LPP. SLP may comprise two components, SUPL Positioning Centre (SPC) and SUPL Location Centre (SLC), which may also reside in different nodes. In an example implementation, SPC has a proprietary interface with E-SMLC, and an Llp interface with SLC, and the SLC part of SLP communicates with P-GW (PDN Gateway) and External LCS Client.

Additional positioning architecture elements may also be deployed to further enhance performance of specific positioning methods. For example, deploying radio beacons is a cost-efficient solution which may significantly improve positioning performance indoors and also outdoors by allowing more accurate positioning, for example, with proximity location techniques.

To meet Location-Based Service (LBS) demands, the LTE network will deploy a range of complementing methods characterized by different performance in different environments. Depending on where the measurements are conducted and the final position is calculated, the methods can be user equipment-based, user equipment-assisted or network-based, each with own advantages. The following methods are available in the LTE standard for both the control plane and the user plane,
  Cell ID (CID),
  UE-assisted and network-based E-CID, including network-based Angle Of Arrival (AoA),
  UE-based and UE-assisted A-GNSS (including A-GPS),
  UE-assisted Observed Time Difference of Arrival (OTDOA).

Hybrid positioning, fingerprinting positioning and adaptive E-CID (AECID) do not require additional standardization and are therefore also possible with LTE. Furthermore, there may also be UE-based versions of the methods above, e.g. UE-based GNSS (e.g. GPS) or UE-based OTDOA, etc. There may also be some alternative positioning methods such as proximity based location. UTDOA may also be standardized in a later LTE release, since it is currently under discussion in 3GPP.

Similar methods, which may have different names, also exist in other Radio Access Technologies (RATs), e.g. WCDMA or GSM.

A drawback with prior art systems is that they degrade positioning accuracy or negatively impact the measurement time.

Another drawback with the prior art systems is that measurements of different types are performed in a serial manner and thus take longer time. For a user equipment in discontinuous reception (DRX), this may also negatively impact the user equipment's power consumption.

SUMMARY

One objective of embodiments herein is to enable a positioning of a user equipment in a radio communications network that is accurate in an efficient manner.

According to a first aspect of embodiments herein the object is achieved by a method in a user equipment for performing a positioning measurement. The user equipment, a positioning node, and a network node are comprised in a communications network.

The user equipment receives positioning assistance data from the positioning node. The positioning assistance data comprises a plurality of reference cells, wherein each reference cell is associated with at least one respective frequency. The positioning assistance data further comprises a set of neighbor cells comprising at least one neighbor cell.

The user equipment further identifies, for each reference cell comprised in the plurality of reference cells, a respective associated set of neighbor cells. The reference cell and the respective associated set of neighbor cells define a group.

Furthermore, the user equipment performs at least one positioning measurement using the positioning assistance data for each respective identified group.

According to a second aspect of embodiments herein the object is achieved by a user equipment for performing a positioning measurement is provided herein.

The user equipment comprises communication circuit configured to receive positioning assistance data from a positioning node. The positioning assistance data comprises a plurality of reference cells, wherein each reference cell is associated with at least one respective frequency. The positioning assistance data further comprises a set of neighbor cells comprising at least one neighbor cell.

The user equipment comprises further, an identifying circuit configured to identify, for each reference cell comprised in the plurality of reference cells, a respective associated set of neighbor cells associated with a reference cell. The respective reference cell and the respective associated set of neighbor cells define a group.

Furthermore, the user equipment comprises a performing circuit configured to perform, for each respective identified group, at least one positioning measurement using the positioning assistance data.

According to a third aspect of embodiments herein the object is achieved by a method in a positioning node for enabling positioning of a user equipment in a radio communications network.

The positioning node generates positioning assistance data. The positioning assistance data comprises a plurality of reference cells, wherein each reference cell is associated with at least one respective frequency, and a set of neighbor cells comprising at least one neighbor cell.

Further, the positioning node transmits the positioning assistance data to the user equipment.

According to a fourth aspect of embodiments herein the object is achieved by a positioning node for enabling positioning of a user equipment in a radio communications network is herein provided.

The positioning node comprises a generating circuit configured to generate positioning assistance data. The positioning assistance data comprises a plurality of reference cells, wherein each reference cell is associated with at least one respective frequency, and a set of neighbor cells comprising at least one neighbor cell.

The positioning node further comprises a communication circuit configured to transmit the positioning assistance data to the user equipment.

By providing positioning assistance data comprising a plurality of reference cells, wherein each reference cell is associated with at least one respective frequency, and a set of neighbor cells comprising at least one neighbor cell; by identifying, for each reference cell comprised in the plurality of reference cells, a respective associated set of neighbor cells associated with a reference cell, wherein the respective reference cell and the respective associated set of neighbor cells define a group; and by performing, for each respective identified group, at least one positioning measurement using the positioning assistance data, the user equipment can be positioned in a more accurate manner without negative impact on the positioning measurement time.

An advantage with embodiments herein is the enhanced positioning performance in multi-frequency radio communications networks and/or multi-RAT networks.

A further advantage with embodiments herein is that the positioning assistance data allow the user equipment to perform inter-frequency and intra-frequency measurements for the cells in the same assistance data, which improve the positioning accuracy and have a positive impact on the measurement time.

A further advantage with some embodiments herein is that they enable parallel positioning measurements on multiple frequencies, which shall enhance positioning performance e.g. for carrier aggregation user equipments, including intra- and inter-frequency RSTD measurements, and inter-frequency RSTD measurements associated with different frequencies.

BRIEF DESCRIPTION OF THE DRAWINGS

Embodiments will now be described in more detail in relation to the enclosed drawings, in which.

DETAILED DESCRIPTION

Figure 1:
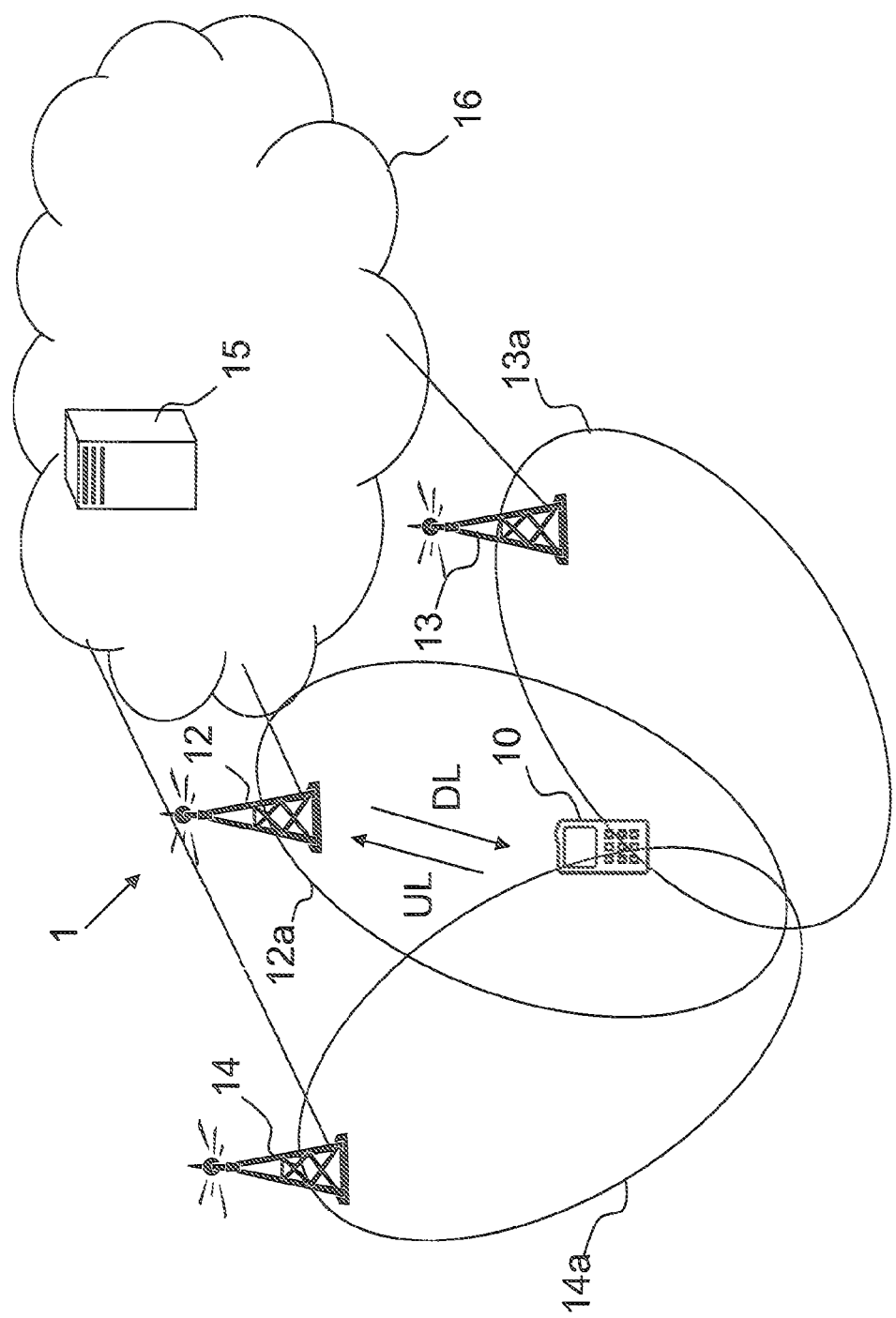
FIG. 1 is a schematic overview of embodiments of a radio communications network.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Those skilled in the art will appreciate that the functions described may be implemented in one or more nodes using hardware circuitry, e.g., analog and/or discrete logic gates interconnected to perform a specialized function, Application-Specific Integrated Circuits (ASICs), Programmable Logic Arrays (PLAs), etc, and/or using software programs and data in conjunction with one or more digital microprocessors or general purpose computers. Nodes that communicate using the air interface also have suitable radio communications circuitry. Moreover, the technology can additionally be considered to be embodied entirely within any to form of computer-readable memory, such as solid-state memory, magnetic disk, or optical disk containing an appropriate set of computer instructions that would cause a processor to carry out the techniques described herein.

Embodiments described herein include methods and apparatus that allow for multiple reference cells in positioning assistance data, parallel intra- and inter-frequency Reference Signal Time Difference (RSTD) measurements, and parallel inter-frequency RSTD measurements associated with different frequencies.

For example, a location server, herein also referred to as a positioning server or positioning node, may employ a list of reference cell elements. However, in some embodiments, a set of reference cell elements may be employed. Further, the positioning node or a base station may use one cell, e.g., a serving cell, as a reference cell. For multiple reference cells, it may be possible to use multiple serving cells (possible with carrier aggregation), which is, however, not a limitation. Furthermore, a reference cell may be UE-specific, e.g., different user equipments may get different reference cells, which may depend e.g. on the user equipment's capability to deal with inter-frequency measurements (e.g. whether measurement gaps are needed for inter-frequency measurements for the user equipment) and the user equipment's ability to deal with co-channel interference. Preferably, for each reference cell element in the assistance data, a frequency for which the reference cell applies is included. However, in some embodiments, for the same frequency, the user equipments served by the same cell may have different reference cells. By including, for each reference cell, a frequency for which the reference cell applies and by controlling the association of the reference cell with a frequency it is possible to configure the user equipment with different measurement types, e.g., intra-frequency, inter-frequency with the reference cell on the same frequency as measured neighbour cells, inter-frequency with the reference cell on the frequency different from that of the neighbour cell frequency (typically longer measurement time than for the first inter-frequency measurement type). The reference cell frequency may or may not be the same as the serving-cell frequency. Further, in a carrier-aggregation system where multiple serving cells may be arranged, multiple reference cells are not necessarily the same as serving cells. Thus, positioning assistance data, such as OTDOA assistance data, is provided for multiple reference cells.

The user equipment receives this multiple reference cell location assistance data to perform location assistance measurements. For each reference cell, the user equipment identifies the associated set of neighbor cells in the assistance data and determines the type of measurements to be made. For example, the association may be by frequency. The user equipment then performs the determined measurements.

With the enhanced assistance data with multiple reference cells, the location server; i.e. the positioning node, ensures that the timing of cells in each group of the cells can be obtained. In some embodiments, a group includes one of the reference cells and its associated neighbor cell from the same location assistance data. For each group of the cells, the location server includes at least one cell, e.g. the user equipment's serving cell, for which the timing reference, e.g., system frame number (SFN), can be obtained by the user equipment.

Although the description is mainly given for a User Equipment (UE) it should be understood by the skilled in the art that "user equipment" or "UE" is a non-limiting term which means any wireless device or node, e.g. Personal Digital Assistance (PDA), laptop, mobile, sensor, fixed relay, mobile relay or even a small base station that is being positioned when timing measurements for positioning are considered, i.e. a LCS target device in general.

The technology described in this application applies both for user equipments capable and not capable of performing inter-frequency measurements without gaps, e.g. also including user equipments capable of carrier aggregation.

A positioning node described in different embodiments is a node with positioning functionality. For example, for LTE it may be understood as a positioning platform in the user plane, e.g., a Secure User Plane Location (SUPL) Location Platform, SLP, in LTE, or a positioning node in the control plane, e.g., the Evolved Serving Mobile Location Centre, E-SMLC, in LTE. SLP may also comprise an SUPL Positioning Centre (SPC) and an SUPL Location Centre (SLC). The SPC may have a proprietary interface with E-SMLC. The positioning node is herein sometimes referred to as a positioning server or a location server.

Although many embodiments are described for the example with assistance data signaled via the LTE Positioning Protocol, LPP, the technology described in embodiments is not limited to LPP, but applies to positioning assistance data that include a reference cell and/or a reference frequency in general and allows for a flexible inter-frequency measurement configuration. A reference cell may be a cell indicated as a reference cell in a plurality or a list of cells in the assistance data. A reference frequency may be a frequency associated with the reference cell, e.g., for which frequency the indicated cell is the reference cell or at which frequency the neighbours measured with respect to the reference cell are. The reference frequency may be different from that of the reference cell frequency. The embodiments also applies e.g. to the assistance data received via LPP extensions, LPPe, or SUPL.

When used in this description, neighbor cell should be understood to mean a cell that is located adjacent to the cell serving the user equipment.

The embodiments are not limited to the currently standardized positioning methods such as Observed Time Difference Of Arrival, OTDOA, measurements such as Reference Signal Time Difference, RSTD, or Radio Access Technologies, RATs, such as LTE. The embodiments may also be adapted for other methods, measurement types, or RAT where the positioning assistance data includes reference cell/frequency and allows for multiple frequencies.

The embodiments in the technology described in this application are described mainly with a focus on inter-frequency measurements. However, the same principles may apply for inter-RAT timing measurements.

FIG. 1 is a schematic overview of a communications network 1, such as a Long Term Evolution (LTE) network, LTE-Advanced network, 3rd Generation Partnership Project (3GPP) Wideband Code Division Multiple Access (WCDMA) network, Global System for Mobile communications/Enhanced Data rate for GSM Evolution (GSM/EDGE) network, Worldwide Interoperability for Microwave Access (WiMax) network, and/or Ultra Mobile Broadband (UMB) network, just to mention a few possible implementations. The communications network 1 may be a multi-frequency radio communications network and/or a multi-RAT communications network.

The communications network 1 comprises a radio network node, such as a first radio base station 12, providing radio coverage over at least one geographical area forming a first reference cell 12a. A user equipment 10 is served in the first cell 12a by the first radio base station 12 and is communicating with the first radio base station 12. The user equipment 10 transmits data over a radio interface to the first radio base station 12 in an uplink (UL) transmission and the first radio base station 12 transmits data to the user equipment 10 in a downlink (DL) transmission. The radio communications network 1 may further comprise a second radio base station 13. The second radio base station 13 provides radio coverage over another geographical area forming a second cell 13a. The radio communications network 1 may further comprise a third radio base station 14. The third radio base station 14 provides radio coverage over another geographical area forming a third cell 14a. Furthermore, the radio communications network 1 may comprise a positioning node 15 arranged in a core network 16 of the radio communications network 1.

As previously described, the term "user equipment" is a non-limiting term which means any wireless terminal, device or node e.g. Personal Digital Assistant (PDA), laptop, mobile, sensor, relay, or even a small base station that is being positioned, such as an LCS target in general. The user equipment may also be capable and not capable of performing inter-frequency measurements without gaps, e.g. a user equipment capable of carrier aggregation.

The respective radio base station 12,13,14, which are examples of radio network nodes, may also be referred to as e.g. a NodeB, an evolved Node B (eNB, eNode B), a base transceiver station, Access Point Base Station, base station router, or any other network unit capable to communicate with a user equipment 10 within the cells 12a,13a,14a depending e.g. of the radio access technology and terminology used. Also, the respective radio base station 12,13,14 may further serve one or more cells and the radio network node serving the user equipment 10 may further be exemplified as a relay node or a beacon node.

As previously mentioned, the positioning node 15 is a node with positioning functionality, i.e. a node configured to perform positioning or to perform one or more actions in a positioning procedure. For example, in LTE, the positioning node 15 may be a positioning platform in the user plane, e.g. Secure User Plane Location (SUPL) Location Platform (SLP), or a positioning node 15 in the control plane, e.g., Evolved Serving Mobile Location Center (E-SMLC).

For enabling positioning of the user equipment 10 in the radio communications network, according to embodiments herein, the positioning node 15 generates positioning assistance data, which positioning assistance data comprises a plurality of reference cells and a set of neighbor cells, wherein each reference cell is associated with at least one respective frequency and wherein the set of neighbor cells comprises at least one neighbor cell. Further, the positioning node 15 transmits the positioning assistance data to the user equipment 10.

In the illustrated example the first cell 12a also called reference cell, is the cell serving the user equipment 10, however, the reference cell in the positioning assistance data may not necessarily be the cell serving the user equipment 10.

The user equipment 10 receives the positioning assistance data from the positioning node 15. For each reference cell comprised in the plurality of reference cells, the user equipment 10 identifies a respective associated set of neighbor cells, wherein the reference cell and the respective associated set of neighbor cells define a group. Further, the user equipment 10 performs at least one positioning measurement using the positioning assistance data for each respective identified group. The user equipment 10 may then report the positioning measurement/s back to the positioning node 15 via the first radio base station 12. The positioning node 15 may calculate the position based on the received positioning measurements. Alternatively or additionally, the user equipment 10 may calculate the position, e.g. in embodiments comprising UE-based OTDOA positioning measurements.

The user equipment 10 may send the determined position to the positioning node 15.

OTDOA Positioning.

The OTDOA positioning method makes use of the measured timing of downlink signals received from multiple base stations 12,13,14, e.g. eNodeBs, 12,13,14 at the user equipment 10. The user equipment 10 measures the timing of the received signals using assistance data received from the LCS server, e.g. the positioning node 15, and the resulting measurements are used to locate the user equipment 10 in relation to the neighbouring, base stations 12,13,14, e.g. eNodeBs. With OTDOA, a terminal, e.g. the user equipment 10, measures the timing differences for downlink reference signals received from multiple distinct locations. For each measured neighbor cell, the user equipment 10 measures Reference Signal Time Difference (RSTD) which is the relative timing difference between neighbor cell and the reference cell. The position estimate of the user equipment 10 is then found as the intersection of hyperbolas corresponding to the measured RSTDs. At least three measurements from geographically dispersed base stations 12,13,14 with a good geometry are needed to solve for two coordinates of the terminal and the receiver clock bias. In order to solve for position, precise knowledge of the transmitter locations and transmit timing offset is needed.

To enable positioning in LTE and facilitate positioning measurements of a proper to quality and for a sufficient number of distinct locations, physical signals dedicated for positioning, e.g. Positioning Reference Signals, or PRS have been introduced and low-interference positioning subframes have been specified in 3GPP.

PRS are transmitted from one antenna port (R6) according to a pre-defined pattern. A frequency shift, which is a function of Physical Cell Identity (PCI), may be applied to the specified PRS patterns to generate orthogonal patterns and modelling the effective frequency reuse of six, which makes it possible to significantly reduce neighbour cell interference on the measured PRS and thus improve positioning measurements. Even though PRS have been specifically designed for positioning measurements and in general are characterized by better signal quality than other reference signals, the standard does not mandate using PRS. Other reference signals, e.g. Cell-specific Reference Signals (CRS) could in principle also be used for positioning measurements.

Assistance Data for Positioning.

The assistance data, herein sometimes also referred to as positioning assistance data or location positioning data or OTDOA assistance data, is intended to assist a user equipment, such as a wireless device or a radio node, in its positioning measurements. Different sets of assistance data is typically used for different methods. The positioning assistance data is typically sent by the positioning server, although it may be sent via other nodes. For example, assistance data may be sent to an eNodeB for being further sent to the UE, e.g. transparently to eNodeB and also MME. In some embodiments, the assistance data may also be sent by the eNodeB via LPPa to positioning server for further transfer to the UE.

The assistance data may be sent on a request or an indication of the need for assistance from the user equipment that will perform measurements or in unsolicited way.

In LTE, the assistance data may be requested by the user equipment and provided over LPP protocol by including provideAssistanceData and requestAssistanceData elements in the LPP message, respectively. The current LTE standard specifies the following structure for provideAssistanceData:

OTDOA Assistance Data.

Since for OTDOA positioning measurements methods, PRS signals from multiple distinct locations need to be measured, the user equipment's, such as user equipment's 10, receiver may have to deal with PRS that are much weaker than those received from the serving cell. Furthermore, without the approximate knowledge of when the measured signals are expected to arrive in time and what is the exact PRS pattern, the user equipment may need to do signal search within a large window which would impact the time and accuracy of the measurements as well as the complexity of the user equipment 10. To facilitate the user equipment 10 to perform measurements, the network, e.g. the positioning node, transmits assistance data to the user equipment 10, which includes, among the others, reference cell information, neighbour cell list containing PCIs of neighbour cells, the number of consecutive downlink subframes, PRS transmission bandwidth, frequency, etc.

For OTDOA, the assistance data is provided with the Information Element, IE, OTDOA-ProvideAssistanceData which comprises the information about the reference cell (one cell in the list) and neighbor cells information (multiple cells):

The neighbor cells may or may not be on the same frequency as the reference cell and the reference cell may or may not be on the same frequency as the serving cell. Measurements that involve cells on a frequency different than the serving cell are inter-frequency measurements. Measurements on the same frequency as the serving cell are intra-frequency measurements. Different requirements apply for intra- and inter-frequency measurements. The frequency information in LPP OTDOA assistance data is signalled as EARFCN, for the reference cell and for neighbour cells, wherein EARFCN is the E-UTRA Absolute Radio Frequency Channel Number. The EARFCN (herein also written earfcn) defines the carrier frequencies for uplink and downlink transmission. Measurements on different frequency as the serving cell are inter-frequency measurements.

The maximum supported, with the current standard, number of frequency layers among the OTDOA neighbour cells included in the OTDOA neighbour cell list in the assistance data in LPP protocol is three, which with the reference cell and the serving cell frequencies give maximum 5 frequency layers.

Assistance Data Extensions with OMA.

With Open Mobile Alliance (OMA) LPP extension (LPPe), the assistance data are enhanced with the possibility to assist a larger range of positioning methods. That means that assistance data may also be provided for E-CID or other methods of other RATs, e.g. UTRA OTDOA or GSM E-OTD or CDMA AFLT, or other PLMN networks. Furthermore, there is also a possibility of carrying over a black-box data container meant for carrying vendor-/operator-specific assistance data.

Inter-Frequency, Inter-Band and Inter-RAT Measurements.

All user equipments should support all intra-RAT measurements, i.e. inter-frequency and intra-band measurements, and to meet the associated requirements. However the inter-band and inter-RAT measurements are user equipment capabilities, which are reported to the network during the call setup. The user equipments may support certain inter-RAT measurements and should meet the corresponding requirements. For example a user equipment 10 may support LTE and WCDMA and should support intra-LTE measurements, intra-WCDMA measurements and inter-RAT measurements, i.e. measuring WCDMA when serving cell is LTE and measuring LTE when serving cell is WCDMA. Hence network may use these capabilities according to its strategy. These capabilities are highly driven by factors such as market demand, cost, typical network deployment scenarios, frequency allocation, etc.

Inter-Frequency Measurements.

Inter-frequency measurements may in principle be considered for any positioning method, even though currently not all measurements are specified by the standard as intra- and inter-frequency measurements. The examples of inter-frequency measurements currently specified by the standard are Reference Signal Time Difference (RSTD) used for OTDOA, RSRP and RSRQ which may be used e.g. for fingerprinting or E-CID.

The user equipment 10 may be configured to perform inter-frequency and inter-RAT measurements in measurement gaps. The measurements may be done for various purposes: mobility, positioning, Self Organizing Network (SON), minimization of drive tests etc. Furthermore the same gap pattern is used for all types of inter-frequency and inter-RAT measurements. Therefore E-UTRAN provides a single measurement gap pattern with constant gap duration for concurrent monitoring, i.e. cell detection and measurements, of all frequency layers and RATs.

Inter-RAT Measurements.

In general in LTE, inter-RAT measurements are typically defined similar to inter-frequency measurements, e.g. they may also require configuring measurement gaps like for inter-frequency measurements, but just with more measurements restrictions and often more relaxed requirements for inter-RAT measurements. As a special example, there may also be multiple networks using the overlapping sets of RATs. The examples of inter-RAT measurements specified currently for LTE are UTRA FDD CPICH RSCP, UTRA FDD carrier RSSI, UTRA FDD CPICH Ec/No, GSM carrier RSSI, and CDMA2000 1x RTT Pilot Strength.

For positioning, assuming that LTE FDD and LTE TDD are treated as different RATs, the current standard defines inter-RAT requirements only for FDD-TDD and TDD-FDD measurements, and the requirements are different in the two cases. There are no other inter-RAT measurements specified within any separate RAT for the purpose of positioning and which are possible to report to the positioning node (e.g. E-SMLC in LTE).

Inter-Band Measurements.

Inter-band measurement refers to the measurement done by the user equipment on a target cell on the carrier frequency belonging to the frequency band which is different than that of the serving cell. Both inter-frequency and inter-RAT measurements can be intra-band or inter-band.

The motivation of inter-band measurements is that most of the user equipments 10 today may support multiple bands even for the same technology. This is driven by the interest from service providers; a single service provider may own carriers in different bands and would like to make efficient use of carriers by performing load balancing on different carriers. A well known example is that of multi-band GSM terminal with 800/900/1800/1900 bands.

Furthermore, a user equipment 10 may also support multiple technologies e.g. GSM, UTRA FDD and E-UTRAN FDD. Since all UTRA and E-UTRA bands are common, therefore the multi-RAT user equipment, such as in some embodiments user equipment 10, may support same bands for all the supported RATs.

Inter-Frequency Requirements for OTDOA Positioning.

For OTDOA, the 3GPP specification defines inter-frequency requirements for RSTD measurements assuming the following two scenarios 1. The reference cell and all neighbor cells provided in the assistance data operate on the same frequency f2, which is different from the serving cell f1;
2. The reference cell is on the serving cell frequency f1, whilst all neighbor cells provided in the assistance data are on the frequency f2, which is different from the serving cell f1.

The requirements are generic with respect to the frequency channels and frequency bands, i.e. the requirements are the same for any two different f1 and f2, independently on their absolute and relative location in the spectrum.

The RSTD reporting delay requirements are quite different for the two scenarios (almost twice as long maximum required reporting delay for the inter-frequency second scenario described above compared to the first inter-frequency scenario).

Figure 2:
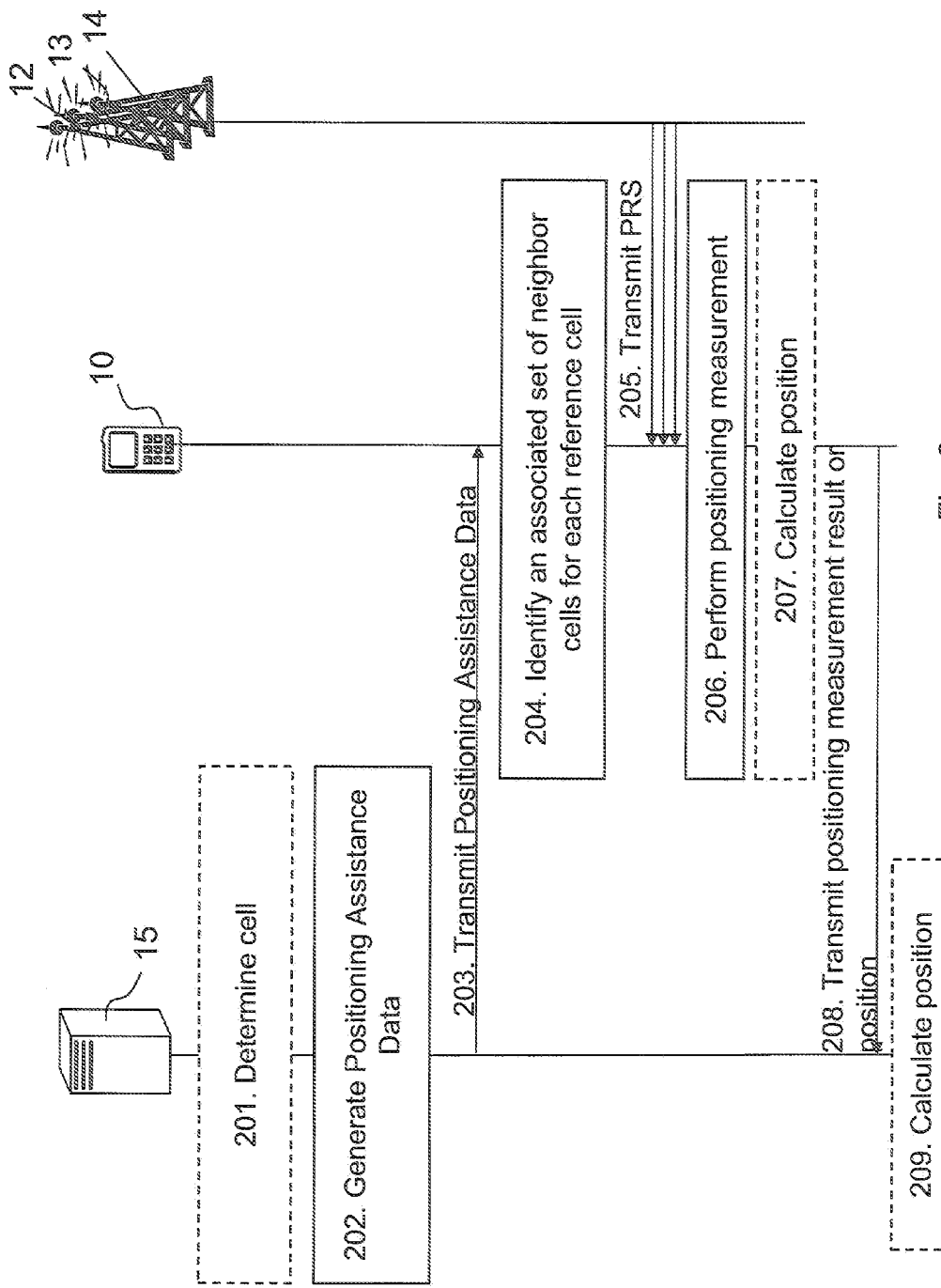
FIG. 2 is a schematic combined flowchart and signaling scheme of embodiments of a radio communications network.

FIG. 2 is a schematic combined flowchart and signaling scheme for positioning the user equipment 10 in a radio communications network. The user equipment 10 is served in a first cell 12a controlled by a radio network node such as the base station 12. A positioning node 15 and the radio network node 12 are comprised in the radio communications network. The actions do not have to be taken in the order stated below, but may be performed in any suitable order.

Action 201.

The positioning node 15 may determine a cell for which a System Frame Number, SFN, is known or can be obtained by the user equipment 10. The determined cell may or may not be a reference cell to be comprised in positioning assistance data generated in action 202. For example, the positioning node 15 may determine a cell ID for a cell serving the user equipment 10. Furthermore, the positioning node 15 may determine a cell ID of a cell neighboring the cell serving the user equipment 10.

Action 202.

The positioning node 15 generates positioning assistance data. The positioning assistance data may be referred to as assistance data such as Observed Time Difference of Arrival (OTDOA) assistance data. The positioning assistance data comprises a plurality of reference cells, wherein each reference cell is associated with at least one respective frequency. The positioning assistance data further comprises a set of neighbor cells comprising at least one neighbor cell. The reference cells in the illustrated example are the first cell 12a and the second cell 13a. In the illustrated example, the third cell 14a is the neighbor cell.

The plurality of reference cells and the neighbor cells may be determined by the positioning node 15 by analyzing signal strengths of the cells, or actually from respective radio base station 12,13,14, reported from the user equipment 10.

As previously mentioned, the assistance data is intended to assist a user equipment 10 or a radio node in its positioning measurements. Different sets of assistance data is typically used for different methods. The positioning assistance data is typically sent by the positioning server, e.g. the positioning node 15, although it may be sent via other nodes. For example, assistance data may be sent to a base station, 12,13, 14, such as an eNodeB, for being further sent to the user equipment, e.g. transparently to the base station, 12,13,14, e.g. the eNodeB, and also MME. The assistance data may also be sent by the base station, e.g. the eNodeB, via LPPa to positioning server for further transfer to the user equipment 10.

The assistance data may be sent on a request from the user equipment that will perform measurements or in unsolicited way.

As previously mentioned, in known systems, there may be only a single reference cell in the OTDOA positioning assistance data. According to some embodiments herein, more than one reference cell may be included in the positioning assistance data, also sometimes referred to as enhanced positioning assistance data. A non-limiting example signal implementation of such embodiments in the non-limiting context of 3GPP TS 36.355 (incorporated by reference) is set forth below.

OTDOA-ReferenceCellInfo. The information element (IE) OTDOA-ReferenceCellInfo is used by a location server, herein also referred to as a positioning node, to provide reference cell information for OTDOA assistance data. The slot number offsets and expected RSTDs in OTDOANeighbour-CellInfoList are provided relative to the cell defined by this information element.

```
-- ASN1START
OTDOA-ReferenceCellInfoList ::=
SEQUENCE (SIZE(1..maxFreqLayers)) OF OTDOA-ReferenceCellInfo
OTDOA-ReferenceCellInfoList::= SEQUENCE {
    physCellId      INTEGER(0...503),
    cellGlobalID    ECGI                OPTIONAL,   -- Need
                                                        ON
    earfcnRef       ARFCN-ValueEUTRA    OPTIONAL,   -- Cond
NotSameAsServ0
    earfcnNeighborCellInfo ARFCN-ValueEUTRA   OPTIONAL,
    antennaPortConfig   ENUMERATED {ports1-or-2, ports4, ...}
    OPTIONAL,--Cond
NotSameAsServ1
    cpLength        ENUMRATED {normal, extended, ...},
    prsInfo         PRS-Info            OPTIONAL,   Cond
                                                        PRS
    ...
}
--ASN1STOP
```

In the example, the protocol enhancements are as follows. First, the reference cell element is extended to a plurality of reference cells, e.g. to a list of reference cell elements. Second, for each reference cell element in the assistance data, a frequency for which the reference cell applies is included. The frequency may or may not be the same frequency as the serving-cell frequency or the reference-cell frequency. If it is, then this frequency information which becomes redundant may be not included, given the user equipment 10 is able to deduce this information e.g. based on the pre-defined condition for the inclusion of the field.

In a special case, the reference cell list comprises a single cell, which makes it possible to ensure backwards compatibility of the proposed change.

With the new signaling, the following four cases 1-4 may occur:

1. When earfcnNeighborCellInfo=earfcnRef and earfcn-Ref is the same as the serving cell frequency, the user equipment 10 may perform intra-frequency measurements on frequency earfcnNeighborCellInfo.
2. When earfcnNeighborCellInfo=earfcnRef and earfcn-Ref is not the same as the serving cell frequency, the user equipment 10 may perform inter-frequency RSTD measurements on frequency earfcnNeighborCellInfo (inter-frequency scenario 1).
3. When earfcnNeighborCellInfo≠earfcnRef and earfcn-Ref is the same as the serving cell frequency, the user equipment 10 may perform inter-frequency RSTD measurements on frequency earfcnNeighborCellInfo and frequency earfcnRef (inter-frequency scenario 2).
4. When earfcnNeighborCellInfo≠earfcnRef and earfcn-Ref is not the same as the serving cell frequency, the user equipment 10 may perform inter-frequency RSTD measurements on frequency earfcnNeighborCellInfo and frequency earfcnRef.

The earfcn is the E-UTRA Absolute Radio Frequency Channel Number defining the carrier frequencies for uplink and downlink transmission. Earfcn is a numerical value and the expression "earfcn frequency/frequencies" denotes the frequency/frequencies that are to be measured. The measurements are performed on signals transmitted by the cells, which cells operate on certain carrier frequency and frequency band, which in turn is designated by an earfnc. The expression "earfcnNeighborCellInfo" refers to the earfcn (frequency/frequencies) of the carrier frequency of one or more neighbor cells, and the expression "earfcnRef" refers to the earfcn (frequency/frequencies) of the carrier frequency of one or more reference cells.

The applicability of the existing RSTD requirements, according to the cases described above, may be need to be specified for the new enhancements, since the old requirements rely on a single reference cell. Furthermore, new requirements may be specified for case 4.

Action 203.

The positioning node 15 transmits the positioning assistance data to the user equipment 10. The positioning assistance data enables positioning of the user equipment 10, described in the actions below.

Action 204.

The user equipment 10 receives the positioning assistance data from the positioning node 15. Further, the user equipment 10 identifies a respective associated set of neighbor cells for each reference cell comprised in the plurality of reference cells. Each reference cell and its respective associated set of neighbor cells define a group.

Action 205.

The respective base station 12,13,14 transmits Positioning Reference Signals, PRS, as previously described.

As previously mentioned, the actions do not have to be taken in the order stated below, but may be performed in any suitable order. Thus, for example, the PRS transmitted in action 205 may be transmitted before the user equipment 10 receives the positioning assistance data as described in action 204. In some embodiments, the PRS is/are transmitted periodically and independently of when the positioning assistance data is transmitted.

Action 206.

The user equipment 10 performs at least one positioning measurement using the positioning assistance data for each respective identified group. The at least one positioning measurement may be an OTDOA positioning measurement as previously described.

Action 207.

The user equipment 10 may perform positioning of the user equipment 10, whereby a position of the user equipment 10 is determined. This is referred to as user equipment-based positioning such as user equipment-based OTDOA positioning previously described.

Action 208.

The user equipment 10 transmits the positioning measurement result or the determined position to the positioning node 15.

Action 209.

The positioning node 15 may perform positioning of the user equipment 10, whereby a position of the user equipment 10 is determined. The positioning node 15 may perform the positioning upon receipt of the result of the positioning measurement performed by the user equipment 10. This is referred to as UE assisted positioning such as user equipment-assisted OTDOA positioning previously described.

Upon receiving the enhanced assistance data, the user equipment 10 may perform the following actions:

The user equipment 10 scans the reference cell list, for each reference cell, the user equipment 10 identifies the associated (via signaled or deduced earfcnNeighborCellInfo) set of neighbor cells in the assistance data, i.e. the user equipment 10 relates each reference cell to a part of the neighbor cell list, for each reference cell and the associated set of neighbor cells in the assistance data, the user equipment 10 determines the corresponding type of measurements that shall apply, the user equipment 10 performs the determined intra- and inter-frequency RSTD measurements within the same session associated with a single positioning request In one embodiment, the determined measurements of different type, i.e. intra- and inter-frequency measurement, for the cells in the same assistance data are performed in parallel, e.g. by user equipments that do not require measurement gaps, in some embodiments user equipment 10. In yet another embodiment, new requirements are specified for such parallel measurements. In yet another embodiment, these new requirements are associated with and apply for user equipments capable of performing such parallel measurements.

Figure 3:
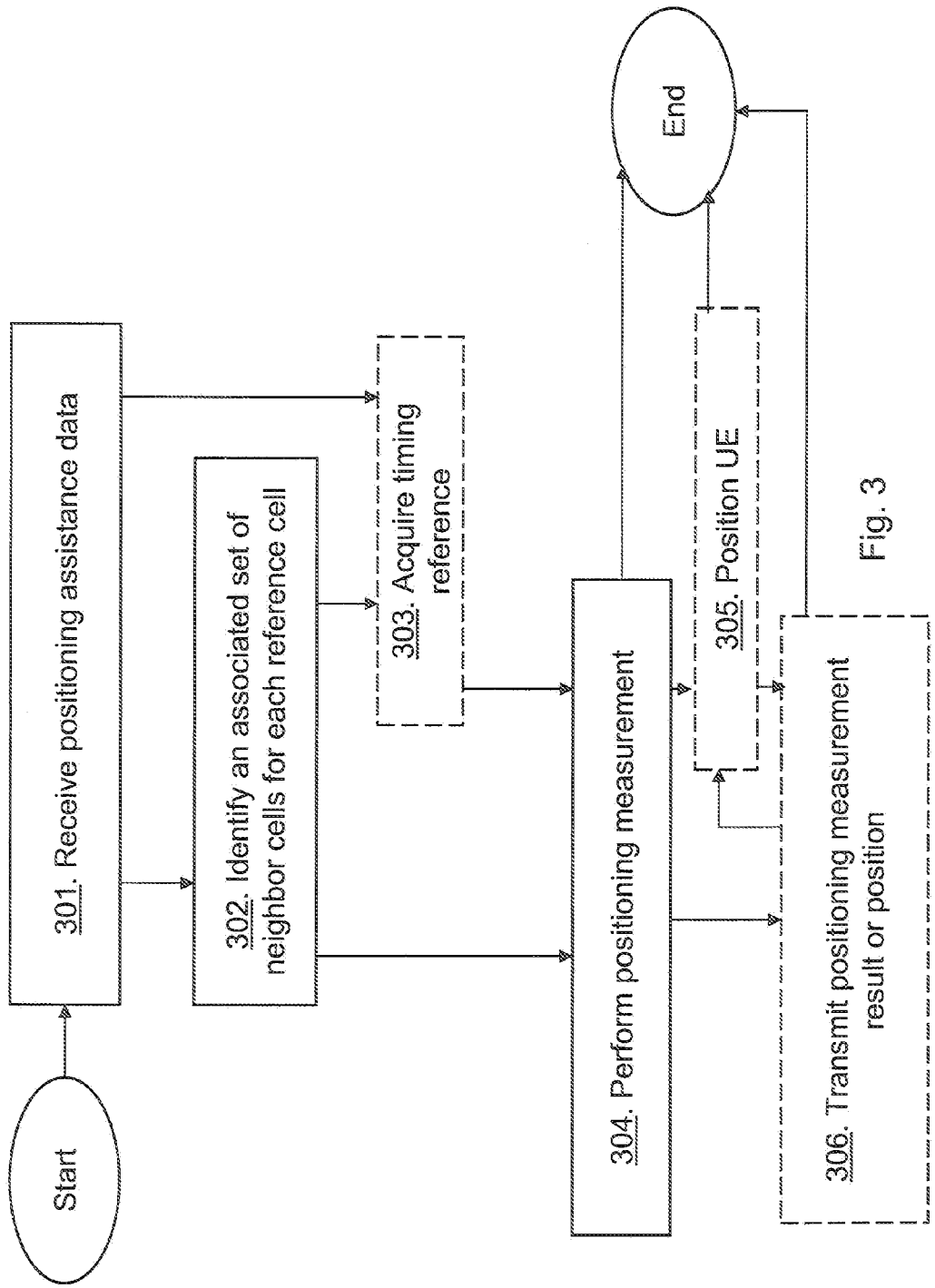
FIG. 3 is a schematic flowchart of embodiments of a method in a user equipment.

Actions performed in the user equipment 10 for performing a positioning measurement according to some general embodiments will now be described with reference to a flow chart depicted in FIG. 3. The user equipment 10 is served in the first cell 12a controlled by the radio network node such as the base station 12. The positioning node 15 and the radio network node 12 are comprised in the radio communications network. The actions do not have to be taken in the order stated below, but may be taken in any suitable order.

Action 301.

The user equipment 10 receives from the positioning node 15, positioning assistance data. The positioning assistance data comprises a plurality of reference cells, wherein each reference cell is associated with at least one respective frequency. The positioning assistance data further comprises a set of neighbor cells comprising at least one neighbor cell.

More than one reference cell of the plurality of reference cells may be associated with one frequency.

Action 302.

The user equipment 10 identifies a respective associated set of neighbor cells for each reference cell comprised in the plurality of reference cells. The reference cell and the respective associated set of neighbor cells define a group.

In some embodiments, the user equipment 10 identifies the associated set of neighbor cells from signaled or deduced Evolved-Universal Terrestrial Radio Access Network, E-UTRAN, absolute radio frequency channel number, earfcn, of the neighbor cells, earfcnNeighborCellInfo.

In some embodiments, at least one of the set of neighbor cells and the respective associated set of neighbor cells comprises a serving cell.

Action 303.

The user equipment 10 may acquire a System Frame Number, SFN, of at least one cell comprised in the group.

Action 304.

The user equipment 10 performs at least one positioning measurement using the positioning assistance data for each respective identified group. The at least one positioning measurement may be an OTDOA positioning measurement as previously described.

Reference Positioning Signal received from one or more base stations 12,13,14 may be used when performing the at least one positioning measurement.

Further, an acquired SFN may be used in the at least one positioning measurement.

In some embodiments, the user equipment 10 performs the at least one positioning measurement by performing an intra-frequency measurement on the cells indicated in earfcnNeighborCellInfo, i.e. on the carrier frequency of the neighbor cells, when the earfcnNeighborCellInfo is equal to the earfcn of the carrier frequency of the reference cell, earfcnRef, and when the earfcnRef is equal to the earfcn of the carrier frequency of the serving cell.

In some embodiments, the user equipment 10 performs the at least one positioning measurement by performing an inter-frequency Reference Signal Time Difference, RSTD, measurement on the carrier frequency of the neighbor cells when the earfcn of the carrier frequency of the neighbor cells is equal to the earfcn of the carrier frequency of the reference cell, and when the earfcn of the carrier frequency of the reference cell is not equal to the earfcn of the carrier frequency of the serving cell.

In some embodiments, the user equipment 10 performs the at least one positioning measurement by performing an inter-frequency Reference Signal Time Difference, RSTD, measurement on the carrier frequency of the neighbor cells and on the carrier frequency of the reference cell when the earfcn of the carrier frequency of the neighbor cells is not equal to earfcn of the carrier frequency of the reference cell, and when the earfcn of the carrier frequency of the reference cell is equal to the earfcn of the carrier frequency of a serving cell.

In some embodiments, the user equipment 10 performs the at least one positioning measurement by performing an inter-frequency Reference Signal Time Difference, RSTD, measurement on the carrier frequency of the neighbor cells and on the carrier frequency of the reference cell, when the earfcn of the carrier frequency of the neighbor cells is not equal to the earfcn of the carrier frequency of the reference cell, and when the earfcn of the carrier frequency of the reference cell is not equal to the earfcn of the carrier frequency of a serving cell.

Further, in some embodiments, the user equipment 10 performs the at least one positioning measurement by performing at least two positioning measurements of different types in parallel.

The at least two positioning measurements of different types may be an intra-frequency measurement and an inter-frequency measurement.

However, the at least two positioning measurements of different types are inter-frequency measurements associated with two different frequencies.

Action 305.

The user equipment 10 may perform positioning, whereby a position of the user equipment 10 is determined.

Action 306.

The user equipment 10 transmits the positioning measurement result or a determined position to the positioning node 15.

Figure 4:
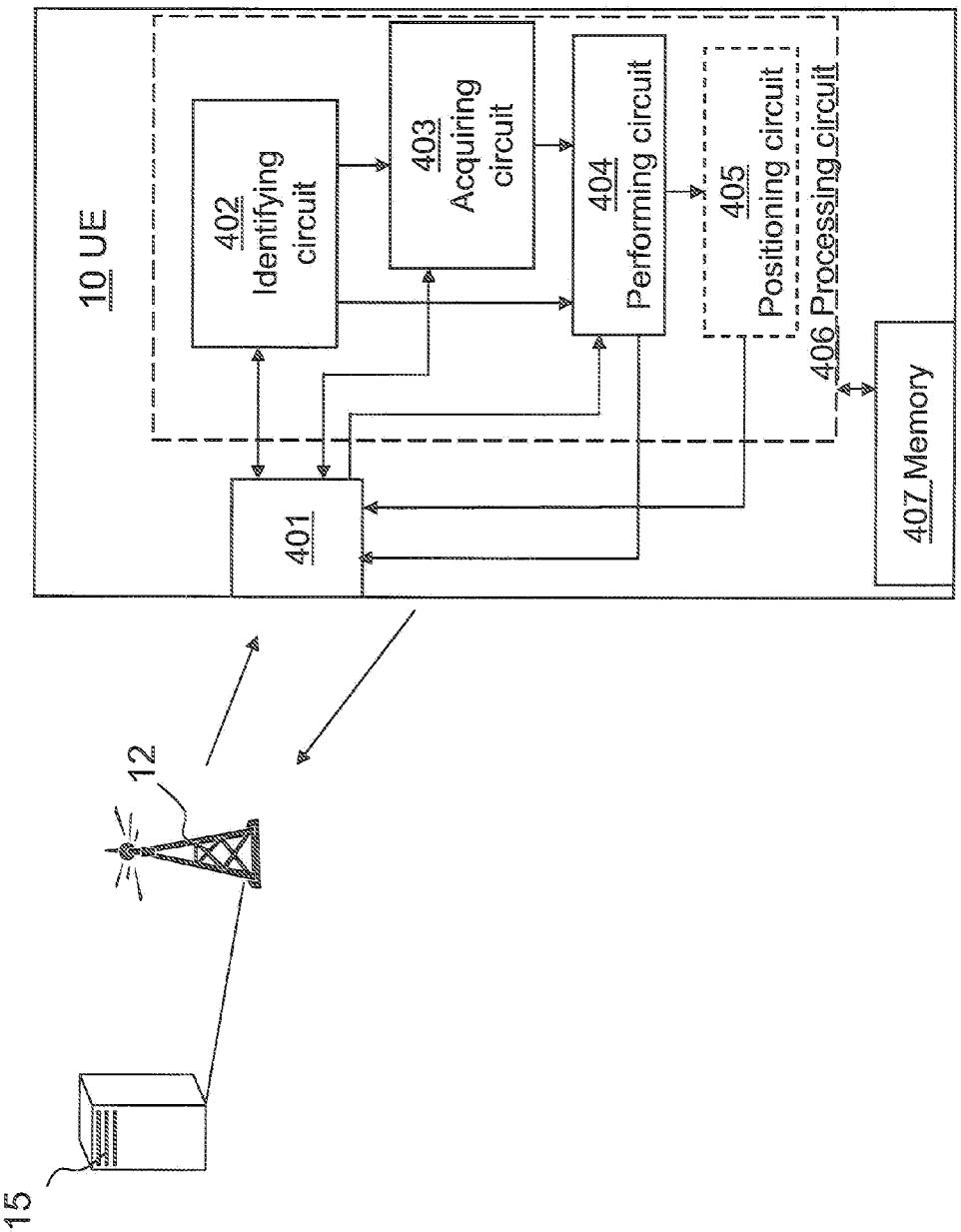
FIG. 4 is a block diagram depicting embodiments of a user equipment.

FIG. 4 is a block diagram depicting an embodiment of a user equipment 10 for performing positioning measurement. The user equipment 10 is served in a first cell 12a controlled by a radio network node such as the base station 12. A positioning node 15 and the radio network node 12 are comprised in a radio communications network.

The user equipment 10 comprises a communication circuitry 401, also referred to as a communication circuit 401, configured to receive positioning assistance data from the positioning node 15. The positioning assistance data comprises a plurality of reference cells, wherein each reference cell is associated with at least one respective frequency. The positioning assistance data further comprises a set of neighbor cells comprising at least one neighbor cell.

The communication circuit 401 may also be configured to transmit a result of a positioning measurement to the positioning node 15.

In some embodiments, more than one reference cell of the plurality of reference cells are associated with one frequency.

The user equipment 10 comprises further an identifying circuit 402 configured to identify, for each reference cell comprised in the plurality of reference cells, a respective associated set of neighbor cells associated with a reference cell. The respective reference cell and the respective associated set of neighbor cells define a group.

The identifying circuit 402 may be configured to identify the associated set of neighbor cells from signaled or deduced Evolved-Universal Terrestrial Radio Access Network, E-UTRAN, absolute radiofrequency channel number, earfcn, for the neighbor cells, earfcnNeighborCellInfo.

The user equipment 10 comprises further a performing circuit 404 configured to perform, for each respective identified group, at least one positioning measurement using the positioning assistance data. The at least one positioning measurement may be an OTDOA positioning measurement as previously described.

The performing circuit 404 may be configured to perform an intra-frequency measurement on the carrier frequency of the neighbor cells when the earfcn of the carrier frequency of the neighbor cells is equal to the earfcn of the carrier frequency of the reference cell and when the earfcn of the carrier frequency of the reference cell is equal to the earfcn of the carrier frequency of the serving cell.

The performing circuit 404 may be configured to perform an interfrequency Reference Signal Time Difference, RSTD, measurement on the carrier frequency of the neighbor cells when the earfcn of the carrier frequency of the neighbor cells is equal to the earfcn of the carrier frequency of the reference cell and when the earfcn of the carrier frequency of the reference cell is not equal to the earfcn of the carrier frequency of the serving cell.

The performing circuit 404 may be configured to perform an interfrequency Reference Signal Time Difference, RSTD, measurement on the carrier frequency of the neighbor cells and on the carrier frequency of the reference cell when the earfcn of the carrier frequency of the neighbor cells is not equal to the earfcn of the carrier frequency of the reference cell and when the earfcn of the carrier frequency of the reference cell is equal to the earfcn of the carrier frequency of the serving cell.

The performing circuit 404 may be configured to perform an interfrequency Reference Signal Time Difference, RSTD, measurement on the carrier frequency of the neighbor cells and on the carrier frequency of the reference cell when the earfcn of the carrier frequency of the neighbor cells is not equal to the earfcn of the carrier frequency of the reference cell and when earfcn of the carrier frequency of the reference cell is not equal to the earfcn of the carrier frequency of the serving cell.

In some embodiments, the performing circuit 404 is configured to perform at least two positioning measurements of different types in parallel.

In some embodiments, the performing circuit 404 is configured to perform, in parallel, an intra-frequency measurement and an inter-frequency measurement.

In some embodiments, the performing circuit 404 is configured to perform, in parallel, two inter-frequency measurements associated with two different frequencies.

In some embodiments, at least one of the set of neighbor cells and the respective associated set of neighbor cells comprises a serving cell.

In some embodiments, the user equipment 10 may further comprise an acquiring circuit 403 configured to acquire an SFN of at least the reference cell or of at least one neighbor cell comprised in the group. In such embodiments, the performing circuit 404 is configured to use the acquired SFN when performing the at least one positioning measurement.

In some embodiments, the user equipment 10 comprises a positioning circuit 405 configured to determine a position of the user equipment 10 based on the performed positioning measurements.

Embodiments herein for performing positioning measurements may be implemented through one or more processors, e.g. microprocessors, such as a processing circuit 406 in the user equipment depicted in FIG. 4, together with computer program code for performing the functions and/or method actions of embodiments herein.

The user equipment 10 may further comprise a memory 407. The memory may comprise one or more memory units and may be used to store for example data such as measured positioning data.

Figure 5:
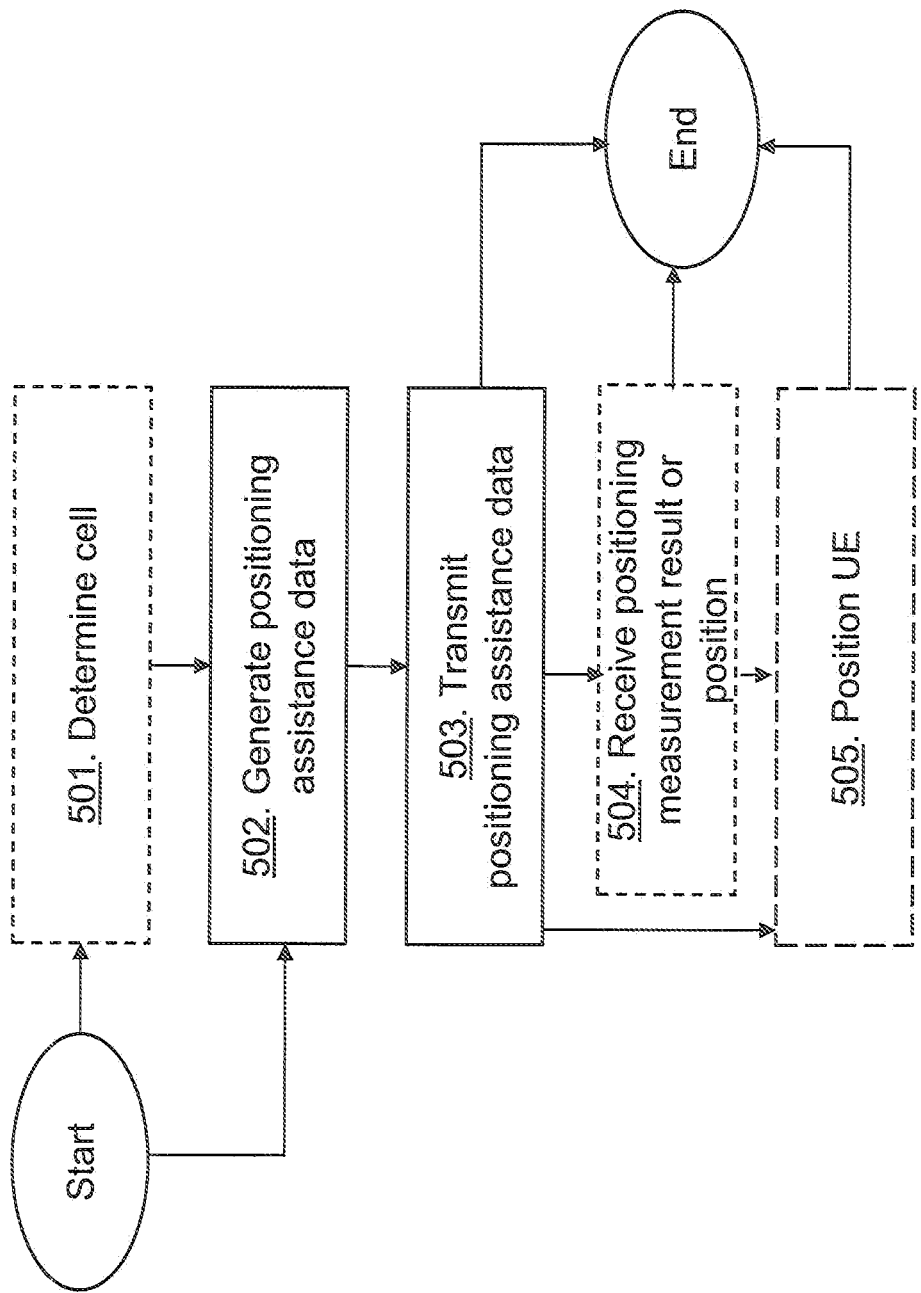
FIG. 5 is a schematic flowchart of embodiments of a method in a positioning node.

The actions on the positioning node 15 for enable positioning of a user equipment 10 in a communications network, according to some general embodiments will now be described with reference to a flowchart depicted in FIG. 5. The actions do not have to be taken in the order started below, but may be taken in any suitable order.

Action 501.

The positioning node 15 may determine a cell for which a System Frame Number, SFN, is known or can be obtained. The positioning node 15 may further determine whether or not the user equipment 10 is capable of performing parallel positioning measurements.

Action 502.

The positioning node 15 generates positioning assistance data comprising a plurality of reference cells, wherein each reference cell is associated with at least one respective frequency. The positioning assistance data further comprises a set of neighbor cells comprising at least one neighbor cell.

When generating the positioning assistance data the positioning node 15 may further, for each respective reference cell, determine a group comprising the respective reference cell and a respective associated set of neighbor cells. The group may comprise the cell for which an SFN was determined in action 501.

Action 503.

The positioning node 15 transmits the positioning assistance data to the user equipment 10. The positioning node 15 may further transmit the determined SFN in the positioning assistance data.

Action 504.

The positioning node 15 may receive positioning measurement result from the user equipment 10. In some embodiments, the positioning node 15 receives a position of the user equipment 10 from the user equipment 10.

Action 505.

The positioning node 15 may position the user equipment 10, i.e. determine a position of the user equipment 10, based on a received positioning measurement result.

Figure 6:
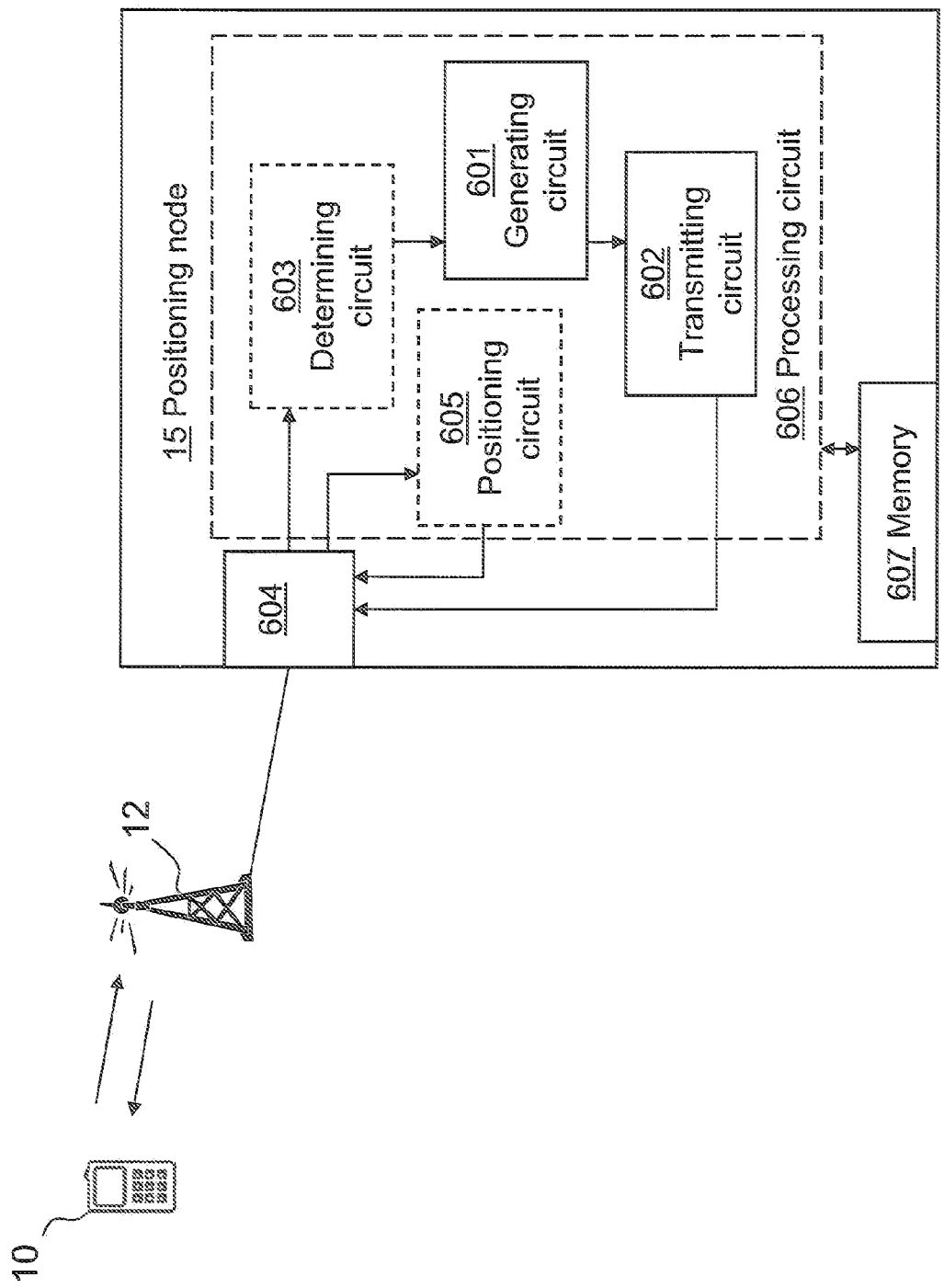
FIG. 6 is a block diagram depicting embodiments of a positioning node.

FIG. 6 is a block diagram of a positioning node 15 arranged to enable positioning of a user equipment 10 in a communications network 1. The user equipment 10 is served in a first cell controlled by a network node 12 comprised in the communications network.

The positioning node 15 comprises a generating circuit 601 configured to generate positioning assistance data. The positioning assistance data comprises a plurality of reference cells, wherein each reference cell is associated with at least one respective frequency. The positioning assistance data comprises further a set of neighbor cells comprising at least one neighbor cell.

In some embodiments, the generating circuit 601 is configured to, for each respective reference cell, determine a group comprising the reference cell and an associated set of neighbor cells.

The positioning node 15 comprises further a transmitting circuit 602 configured to transmit the positioning assistance data to the user equipment 10.

In some embodiments, the positioning node comprises a determining circuit 603 configured to determine a cell comprised in the group for which a System Frame Number, SFN, is known or can be obtained. In such embodiments, the transmitting circuit 602 may be configured to transmit the determined SFN in the positioning assistance data.

The determining circuit 603 may be configured to determine whether the user equipment 10 is capable of performing parallel positioning measurements.

In some embodiments, the positioning node 15 may further comprise communication circuitry 604, also referred to as a communication circuit 604, configured to receive a result of a positioning measurement from the user equipment 10. In such embodiments, the positioning node 15 may further comprise a positioning circuit 605 configured to determine a position of the user equipment 10 based on the received positioning measurement result.

Embodiments herein for enabling positioning measurements may be implemented through one or more processors, e.g. a microprocessor, such as a processing circuit 606 in the positioning node depicted in FIG. 6, together with computer program code for performing the functions and/or method actions of embodiments herein.

The positioning node 15 may further comprise a memory 607. The memory may comprise one or more memory units and may be used to store for example data such as measured positioning data.

Resolving SFN Issue.

The 3GPP standard specifies that: the location server, e.g. the positioning node, should include at least one cell, e.g. the serving cell, for which the SFN can be obtained by the user equipment in the assistance data. The at least one cell should be included in the assistance data either as a reference cell or as a neighbor cell. Otherwise the user equipment will be unable to perform the OTDOA measurement and the positioning operation will fail.

With the enhanced assistance data with multiple reference cells as disclosed herein, the timing of cells in each group of the cells may be obtained, where said group comprises one of the reference cells and the associated with it neighbor cells from the same assistance data. To enable this in a generic way, the currently standardized requirement described above has to be modified. In particular, with the new assistance data, the requirement applies to each group of the cells: for each group of the cells, the location server, e.g. the positioning node 15, includes at least one cell for which the SFN can be obtained by the user equipment, e.g., the serving cell, in the assistance data, either as a reference cell or as a neighbor cell. Otherwise, the user equipment will be unable to perform the OTDOA measurement and the positioning operation will fail.

It should be noted that for a fully synchronous network, the requirement is automatically met when cells on all frequencies are synchronized, since the SFN is then the same for all cells and it is the same as for the serving cell which is typically known to the user equipment 10.

Figure 7:
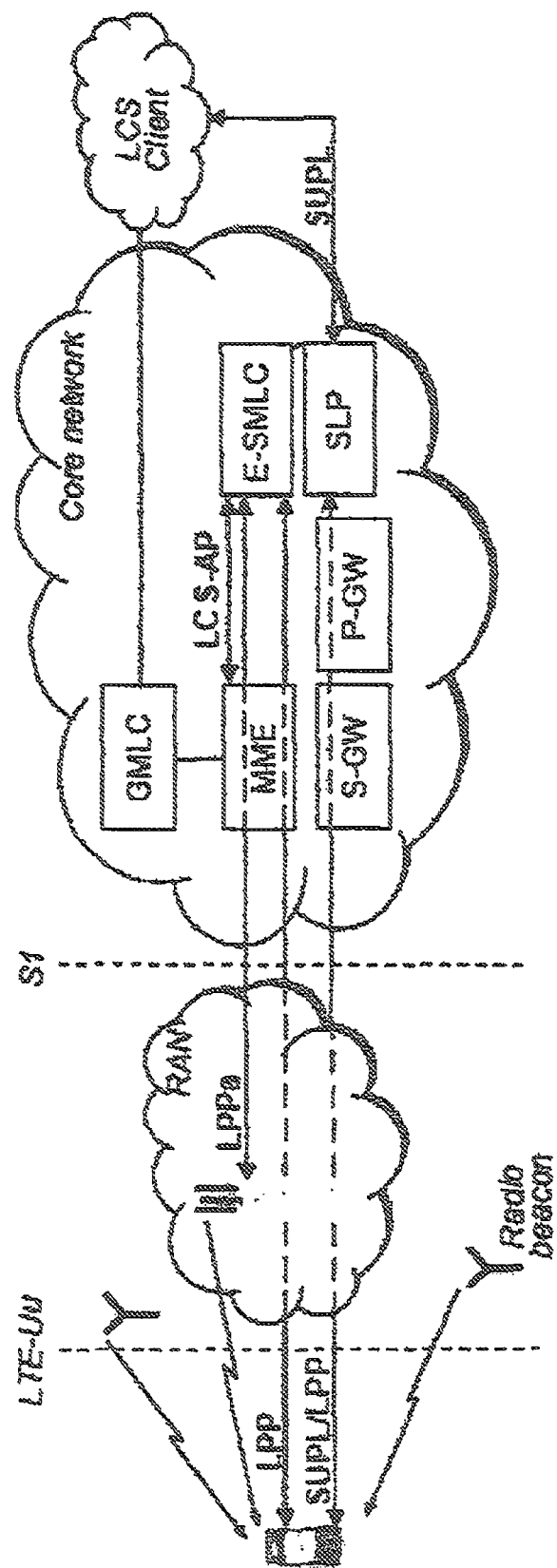
FIG. 7 is a block diagram depicting embodiments of a positioning architecture in LTE.

As previously mentioned, in a high-level architecture, as it is currently standardized in LTE, the LCS target is a user equipment such as a terminal, and the LCS Server is an E-SMLC or an SLP. Such a high-level architecture is illustrated in FIG. 7. In the figure, the control plane positioning protocols with E-SMLC as the terminating point are shown as LCS AP, LPPa, LPP, and the user plane positioning protocol is shown as SUPL and SUPL/LPP. SLP may comprise two components, an SPC and an SLC, which may also reside in different nodes. In an example implementation, SPC has a proprietary interface with E-SMLC, and an Llp interface with SLC, and the SLC part of SLP communicates with P-GW (PDN-Gateway) and External LCS Client.

It is also straightforward to adapt the new requirement described above e.g. for carrier aggregation systems.

Multi-Carrier Systems.

A multi-carrier system, or interchangeably called Carrier Aggregation (CA), allows the user equipment 10 to simultaneously receive and/or transmit data over more than one carrier frequency. Each carrier frequency is often referred to as a Component Carrier (CC) or simply a serving cell in the serving sector, more specifically a primary serving cell or secondary serving cell. The multi-carrier concept is used in both HSPA and LTE.

Contiguous and Non-Contiguous Carrier Aggregation.

Intra-RAT multi-carrier system means that all the component carriers belong to the same RAT e.g. LTE FDD multi-carrier system, LTE TDD multi-carrier system, UTRAN FDD multi-carrier system, UTRAN TDD multi-carrier system and so on.

Figure 8:
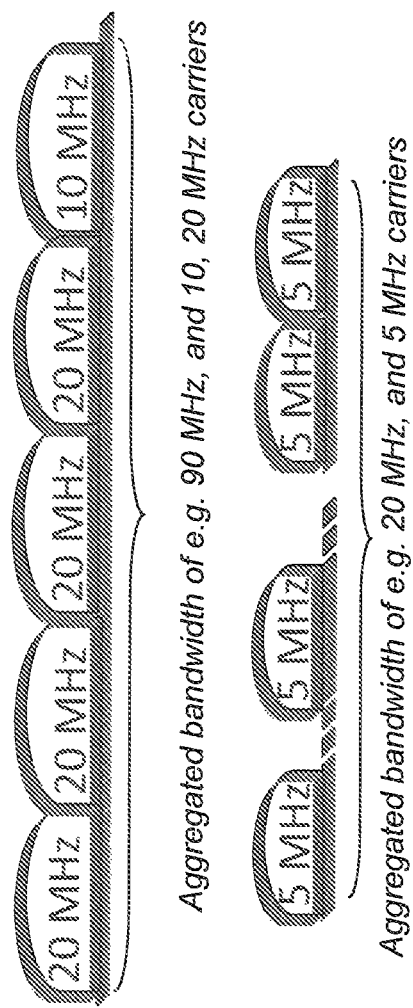
FIG. 8 is a schematic view of embodiments of a carrier aggregation.

In a LTE multi-carrier system it is possible to aggregate a different number of component carriers of different bandwidths in the uplink, UL, and the downlink, DL, as illustrated in FIG. 8.

In a multi-carrier system one of the component carriers is called the anchor carrier and the remaining ones are called the supplementary carriers. Other terminologies used in literature for the anchor and supplementary carriers are the primary and secondary carriers, respectively.

Yet other commonly known terminologies for the anchor and supplementary carriers are the primary serving cell and secondary serving cell respectively. The primary carrier carries all common and user equipment-specific control channels. The secondary carrier may contain only necessary signaling information and signals, e.g., those that are user equipment-specific may be not present in the secondary carrier, since both primary uplink and downlink carriers are typically user equipment-specific. This means that different user equipments in a cell may have different downlink primary carriers. Same is true for the uplink primary carriers. For example in a multi-carrier system comprising of 2 DL (F1

DL, F2_DL) and 2 UL carriers (F1_UL, F2 UL), some of the user equipments may have F1 DL as the primary carrier and remaining ones may have F2_DL as their primary carrier. The network is able to change the primary carrier of the user equipment at any time. This is done, for example, to balance the load on different carriers.

The simultaneous transmission and/or reception of the carriers enable the user equipment to significantly increase its data reception and transmission rates. For instance, 2×20 MHz aggregated carriers in LTE multi-carrier system would theoretically lead to two-fold increase in data rate compared to that attained by a single 20 MHz carrier.

The component carriers may be contiguous or non-contiguous, as shown in FIG. 8. Furthermore in case of non-contiguous carriers, they may belong to the same frequency band or to different frequency bands. A hybrid carrier aggregation scheme comprising of contiguous and non-contiguous component carriers are also envisaged in LTE.

In LTE advanced, several contiguous and non-contiguous carrier aggregation scenarios are being considered.

A scenario comprising of 5 contiguous component carriers each of 20 MHz (i.e. 5×20 MHz) is being considered for LTE TDD. Similarly for LTE FDD a scenario comprising of 4 contiguous component carriers each of 20 MHz (i.e. 5×20 MHz) in the downlink and 2 contiguous component carriers in the uplink is being studied.

An example of DL non-contiguous carrier aggregation comprises of 2 DL CCs each of 10 MHz with a maximum gap of 20 MHz in between. This means the total spectrum block is of 40 MHz. There is only 1 UL component carrier of 10 MHz.

Multi-RAT Carrier Aggregation.

In inter-RAT multi-carrier system, the component carriers may belong to different RATs. For example, in such systems one component carrier may belong to LTE FDD and another one to LTE TDD. Yet another example comprises component carriers belonging to UTRAN FDD and E-UTRAN FDD. In such systems one of the RATs may be considered as the main or primary RAT while the remaining ones as the auxiliary RATs.

Multi-Band Carrier Aggregation.

The multi-band carrier aggregation allows the user equipment to simultaneously receive and transmit data over component carriers belonging to different bands e.g. bands 900 MHz and 1800 MHz. In case of HSPA (UTRA FDD) the agreed multi-band carrier aggregation scenarios include: 850 MHz/2100 MHz, 900 MHz/2100 MHz and 1900 MHz/1700 MHz. In case of LTE there are several multi-band carrier aggregation scenario e.g. aggregation of three component carriers belonging to 3 different bands, e.g. 1800 MHz/2100 MHz/2600 MHz.

Regardless of number of aggregated bands, there is one primary or the so-called anchor carrier in both HSPA and LTE advanced. Hence, the user equipment is required to perform the neighbor cell measurements e.g. path loss, received signal strength, received signal quality etc., at least over the anchor carrier or the anchor band. Secondly, the component carrier may be semi-dynamically changed. Thirdly, for the sake of coverage and load balancing, different user equipments are typically assigned anchor carrier belonging to different bands. This means that the user equipment would typically be performing measurements over different bands, which could also lead to substantial difference in the reported values due to difference in the propagation condition. Despite this difference the measurements should be usable by the network for determining the user equipment position from the reference radio fingerprints.

ABBREVIATIONS

3GPP 3$^{rd}$ Generation Partnership Project
A-GPS Assisted GPS
BS Base Station
CRS Cell-specific Reference Signal
eNodeB evolved Node B
E-SMLC Evolved SMLC
GPS Global Positioning System
LPP LTE Positioning Protocol
LPFa LPP Annex
LTE Long-Term Evolution
OMA Open Mobile Alliance
OTDOA Observed Time Difference Of Arrival
PCI Physical Cell Identity
PRS Positioning Reference Signal
RB Resource Block
RE Resource Element
RRC Radio Resource Control
RS Reference Signal
SFN System Frame Number
SINR Signal-to-Interference Ratio
SMLC Serving Mobile Location Center
UE User Equipment
UMTS Universal Mobile Telecommunications System Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of "consist at least of".

In the drawings and specification, there have been disclosed exemplary embodiments herein. However, many variations and modifications may be made to these embodiments without substantially departing from the principles of the embodiments. Accordingly, although specific terms are employed, they are used in a generic and descriptive sense only and not for purposes of limitation, the scope of the invention being defined by the following claims.

The invention claimed is:

1. A method in a user equipment for performing positioning measurement, the method comprises:
    receiving positioning assistance data from a positioning node, which positioning assistance data comprises:
        a plurality of reference cells, wherein each reference cell is associated with at least one respective carrier frequency, and
        a set of neighbor cells comprising at least one neighbor cell;
    for each reference cell comprised in the plurality of reference cells, identifying a respective associated set of neighbor cells, wherein the reference cell and the respective associated set of neighbor cells define a group, and
    performing at least two positioning measurements of different types in parallel using the positioning assistance data for each respective identified group, wherein at least one of the set of neighbor cells and the respective associated set of neighbor cells comprises a serving cell, and wherein performing at least two positioning measurements further comprises performing an intra-frequency measurement on the carrier frequency of the neighbor cells when the Evolved Absolute Radio Frequency Channel Number earfcn of the carrier frequency of the neighbor cells is equal to the earfcn of the carrier frequency of the reference cell and when the Evolved Absolute Radio Frequency Channel Number earfcn of the carrier frequency of the reference cell is equal to the Evolved Absolute Radio Frequency Channel Number earfcn of the carrier frequency of the serving cell.

2. The method according to claim 1, wherein identifying an associated set of neighbor cells comprised in the positioning assistance data further comprises identifying the associated set of neighbor cells from signaled or deduced Evolved Absolute Radio Frequency Channel Number earfcn of the carrier frequency of the neighbor cells.

3. The method according to claim 1, wherein the at least two positioning measurements of different types are an intra-frequency measurement and an inter-frequency measurement.

4. The method according to claim 1, wherein the at least two positioning measurements of different types are inter-frequency measurements associated with two different carrier frequencies.

5. The method according to claim 1, further comprising acquiring a System Frame Number, SFN, of at least one cell comprised in the group and performing the at least one positioning measurement using the acquired SFN.

6. The method according to claim 1 wherein more than one reference cell of the plurality of reference cells are associated with one carrier frequency.

7. The method according to claim 1, further comprising transmitting a result of the positioning measurement to the positioning node.

8. The method according to claim 1, further comprising positioning the user equipment, whereby a position of the user equipment is determined, and transmitting the determined position of the user equipment to the positioning node.

9. A method in a user equipment for performing positioning measurement, the method comprises:

receiving positioning assistance data from a positioning node, which positioning assistance data comprises:
a plurality of reference cells, wherein each reference cell is associated with at least one respective carrier frequency, and
a set of neighbor cells comprising at least one neighbor cells;
for each reference cell comprised in the plurality of reference cells, identifying a respective associated set of neighbor cells, wherein the reference cell and the respective associated set of neighbor cells define a group, and
performing at least two positioning measurements of different types in parallel using the positioning assistance data for each respective identified group,
wherein at least one of the set of neighbor cells and the respective associated set of neighbor cells comprises a serving cell, and
wherein performing at least two positioning measurements further comprises performing an inter-frequency Reference Signal Time Difference, RSTD, measurement on the carrier frequency of the neighbor cells when the Evolved Absolute Radio Frequency Channel Number earfcn of the carrier frequency of the neighbor cells is equal to the Evolved Absolute Radio Frequency Channel Number earfcn of the carrier frequency of the reference cell, and when the Evolved Absolute Radio Frequency Channel Number earfcn of the carrier frequency of the reference cell is not equal to the Evolved Absolute Radio Frequency Channel Number earfcn of the carrier frequency of the serving cell.

10. The method according to claim 9, wherein identifying an associated set of neighbor cells comprised in the positioning assistance data further comprises identifying the associated set of neighbor cells from signaled or deduced Evolved Absolute Radio Frequency Channel Number earfcn of the carrier frequency of the neighbor cells.

11. The method according to claim 9, further comprising acquiring a System Frame Number, SFN, of at least one cell comprised in the group and performing the at least one positioning measurement using the acquired SFN.

12. The method according to claim 9 wherein more than one reference cell of the plurality of reference cells are associated with one carrier frequency.

13. A method in a user equipment for performing positioning measurement, the method comprises:

receiving positioning assistance data from a positioning node, which positioning assistance data comprises:
a plurality of reference cells, wherein each reference cell is associated with at least one respective carrier frequency, and
a set of neighbor cells comprising at least one neighbor cells;
for each reference cell comprised in the plurality of reference cells, identifying a respective associated set of neighbor cells, wherein the reference cell and the respective associated set of neighbor cells define a group, and
performing at least two positioning measurements of different types in parallel using the positioning assistance data for each respective identified group,
wherein at least one of the set of neighbor cells and the respective associated set of neighbor cells comprises a serving cell, and
wherein performing at least two positioning measurements further comprises performing an inter-frequency Reference Signal Time Difference, RSTD, measurement on the carrier frequency of the neighbor cells and on the carrier frequency of the reference cell when the Evolved Absolute Radio Frequency Channel Number earfcn of the carrier frequency of the neighbor cells is not equal to the Evolved Absolute Radio Frequency Channel Number earfcn of the carrier frequency of the reference cell, and when the Evolved Absolute Radio Frequency Channel Number earfcn of the carrier frequency of the reference cell is equal to the Evolved Absolute Radio Frequency Channel Number earfcn of the carrier frequency of a serving cell.

14. The method according to claim 13, wherein identifying an associated set of neighbor cells comprised in the positioning assistance data further comprises identifying the associated set of neighbor cells from signaled or deduced Evolved Absolute Radio Frequency Channel Number earfcn of the carrier frequency of the neighbor cells.

15. The method according to claim 13, further comprising acquiring a System Frame Number, SFN, of at least one cell comprised in the group and performing the at least one positioning measurement using the acquired SFN.

16. The method according to claim 13 wherein more than one reference cell of the plurality of reference cells are associated with one carrier frequency.

17. A method in a user equipment for performing positioning measurement, the method comprises:
- receiving positioning assistance data from a positioning node, which positioning assistance data comprises:
  - a plurality of reference cells, wherein each reference cell is associated with at least one respective carrier frequency, and
  - a set of neighbor cells comprising at least one neighbor cells;
- for each reference cell comprised in the plurality of reference cells, identifying a respective associated set of neighbor cells, wherein the reference cell and the respective associated set of neighbor cells define a group, and
- performing at least two positioning measurements of different types in parallel using the positioning assistance data for each respective identified group,
- wherein at least one of the set of neighbor cells and the respective associated set of neighbor cells comprises a serving cell, and
- wherein performing at least two positioning measurements further comprises performing an inter-frequency Reference Signal Time Difference, RSTD, measurement on the carrier frequency of the neighbor cells and on the carrier frequency of the reference cell, when the Evolved Absolute Radio Frequency Channel Number earfcn of the carrier frequency of the neighbor cells is not equal to the Evolved Absolute Radio Frequency Channel Number earfcn of the carrier frequency of the reference cell, and when the Evolved Absolute Radio Frequency Channel Number earfcn of the carrier frequency of the reference cell is not equal to the Evolved Absolute Radio Frequency Channel Number earfcn of the carrier frequency of a serving cell.

18. The method according to claim 17, wherein identifying an associated set of neighbor cells comprised in the positioning assistance data further comprises identifying the associated set of neighbor cells from signaled or deduced Evolved Absolute Radio Frequency Channel Number earfcn of the carrier frequency of the neighbor cells.

19. The method according to claim 17, further comprising acquiring a System Frame Number, SFN, of at least one cell comprised in the group and performing the at least one positioning measurement using the acquired SFN.

20. The method according to claim 17 wherein more than one reference cell of the plurality of reference cells are associated with one carrier frequency.

21. A user equipment for performing positioning measurement wherein the user equipment comprises;
- a communication circuit configured to receive, from a positioning node, positioning assistance data, which positioning assistance data comprises:
  - a plurality of reference cells, wherein each reference cell is associated with at least one respective carrier frequency, and
  - a set of neighbor cells comprising at least one neighbor cell;
- an identifying circuit configured to identify, for each reference cell comprised in the plurality of reference cells, a respective associated set of neighbor cells associated with a reference cell, wherein the respective reference cell and the respective associated set of neighbor cells define a group, and
- a performing circuit configured to perform, for each respective identified group, at least two positioning measurements of different types in parallel using the positioning assistance data,
- wherein at least one of the set neighbor cells and the respective associated set of neighbor cells comprises a serving cell, and
- wherein the performing circuit further is configured to perform an intra-frequency measurement on the carrier frequency of the neighbor cells when the Evolved Absolute Radio Frequency Channel Number earfcn of the carrier frequency of the neighbor cells is equal to the Evolved Absolute Radio Frequency Channel Number earfcn of the carrier frequency of the reference cell and when the Evolved Absolute Radio Frequency Channel Number earfcn of the carrier frequency of the reference cell is equal to the Evolved Absolute Radio Frequency Channel Number earfcn of the carrier frequency of the serving cell.

22. The user equipment according to claim 21, wherein the identifying circuit further is configured to identify the associated set of neighbor cells from signaled or deduced earfcn of the carrier frequency of the neighbor cells.

23. The user equipment to claim 21, wherein the performing circuit further is configured to perform, in parallel, an intra-frequency measurement and an inter-frequency measurement.

24. The user equipment to claim 21, wherein the performing circuit further is configured to perform, in parallel, two inter-frequency measurements associated with two different carrier frequencies.

25. The user equipment to claim 21, further comprising an acquiring circuit configured to acquire an SFN of at least the reference cell or of at least one neighbor cell comprised in the group, and wherein the performing circuit is configured to use the acquired SFN when performing the at least one positioning measurement.

26. The user equipment according to claim 21, wherein more than one reference cell of the plurality of reference cells are associated with one carrier frequency.

27. The user equipment according to claim 21, wherein the communication circuit is configured to transmit a result of the positioning measurement to the positioning node.

28. The user equipment according to claim 21, further comprising a positioning circuit configured to determine a position of the user equipment based on the performed positioning measurements, and wherein the communication circuit is configured to transmit the position of the user equipment to the positioning node.

29. A user equipment for performing positioning measurement wherein the user equipment comprises:
- a communication circuit configured to receive, from a positioning node, positioning assistance data, which positioning assistance data comprises:
  - a plurality of reference cells, wherein each reference cell is associated with at least one respective carrier frequency, and
  - a set of neighbor cells comprising at least one neighbor cells;
- an identifying circuit configured to identify, for each reference cell comprised in the plurality of reference cells, a respective associated set of neighbor cells associated with a reference cell, wherein the respective reference cell and the respective associated set of neighbor cells define a group, and
- a performing circuit configured to perform, for each respective identified group, at least two positioning measurements of different types in parallel using the positioning assistance data, wherein at least one of the set of neighbor cells and the respective associated set of neighbor cells comprises a serving cell, and wherein the performing circuit further is configured to perform an inter-frequency Reference Signal Time Difference, RSTD, measurement on the carrier frequency of the neighbor cells when the Evolved Absolute Radio Frequency Channel Number earfcn of the carrier frequency of the neighbor cells is equal to the Evolved Absolute Radio Frequency Channel Number earfcn of the carrier frequency of the reference cell and when the Evolved Absolute Radio Frequency Channel Number earfcn of the carrier frequency of the reference cell is not equal to the Evolved Absolute Radio Frequency Channel Number earfcn of the carrier frequency of the serving cell.

30. The user equipment according to claim 29, wherein the identifying circuit further is configured to identify the associated set of neighbor cells from signaled or deduced Evolved Absolute Radio Frequency Channel Number earfcn of the carrier frequency of the neighbor cells.

31. The user equipment to claim 29, further comprising an acquiring circuit configured to acquire an SFN of at least the reference cell or of at least one neighbor cell comprised in the group, and wherein the performing circuit is configured to use the acquired SFN when performing the at least one positioning measurement.

32. The user equipment according to claim 29, wherein more than one reference cell of the plurality of reference cells are associated with one carrier frequency.

33. A user equipment for performing positioning measurement wherein the user equipment comprises:
a communication circuit configured to receive, from a positioning node, positioning assistance data, which positioning assistance data comprises:
a plurality of reference cells, wherein each reference cell is associated with at least one respective carrier frequency, and
a set of neighbor cells comprising at least one neighbor cells;
an identifying circuit configured to identify, for each reference cell comprised in the plurality of reference cells, a respective associated set of neighbor cells associated with a reference cell, wherein the respective reference cell and the respective associated set of neighbor cells define a group, and
a performing circuit configured to perform, for each respective identified group, at least two positioning measurements of different types in parallel using the positioning assistance data,
wherein at least one of the set of neighbor cells and the respective associated set of neighbor cells comprises a serving cell, and
wherein the performing circuit further is configured to perform an inter-frequency Reference Signal Time Difference, RSTD, measurement on the carrier frequency of the neighbor cells and on the carrier frequency of the reference cell when the Evolved Absolute Radio Frequency Channel Number earfcn of the carrier frequency of the neighbor cells is not equal to the Evolved Absolute Radio Frequency Channel Number earfcn of the carrier frequency of the reference cell and when the Evolved Absolute Radio Frequency Channel Number earfcn of the carrier frequency of the reference cell is equal to the Evolved Absolute Radio Frequency Channel Number earfcn of the carrier frequency of the serving cell.

34. The user equipment according to claim 33, wherein the identifying circuit further is configured to identify the associated set of neighbor cells from signaled or deduced Evolved Absolute Radio Frequency Channel Number earfcn of the carrier frequency of the neighbor cells.

35. The user equipment to claim 33, further comprising an acquiring circuit configured to acquire an SFN of at least the reference cell or of at least one neighbor cell comprised in the group, and wherein the performing circuit is configured to use the acquired SFN when performing the at least one positioning measurement.

36. The user equipment according to claim 33, wherein more than one reference cell of the plurality of reference cells are associated with one carrier frequency.

37. A user equipment for performing positioning measurement wherein the user equipment comprises:
a communication circuit configured to receive, from a positioning node, positioning assistance data, which positioning assistance data comprises:
a plurality of reference cells, wherein each reference cell is associated with at least one respective carrier frequency, and
a set of neighbor cells comprising at least one neighbor cells;
an identifying circuit configured to identify, for each reference cell comprised in the plurality of reference cells, a respective associated set of neighbor cells associated with a reference cell, wherein the respective reference cell and the respective associated set of neighbor cells define a group, and
a performing circuit configured to perform, for each respective identified group, at least two positioning measurements of different types in parallel using the positioning assistance data,
wherein at least one of the set of neighbor cells and the respective associated set of neighbor cells comprises a serving cell, and
wherein the performing circuit further is configured to perform an inter-frequency Reference Signal Time Difference, RSTD, measurement on the carrier frequency of the neighbor cells and on the carrier frequency of the reference cell when the Evolved Absolute Radio Frequency Channel Number earfcn of the carrier frequency of the neighbor cells is not equal to the Evolved Absolute Radio Frequency Channel Number earfcn of the carrier frequency of the reference cell and when Evolved Absolute Radio Frequency Channel Number earfcn of the carrier frequency of the reference cell is not equal to the Evolved Absolute Radio Frequency Channel Number earfcn of the carrier frequency of the serving cell.

38. The user equipment according to claim 37, wherein the identifying circuit further is configured to identify the associated set of neighbor cells from signaled or deduced Evolved Absolute Radio Frequency Channel Number earfcn of the carrier frequency of the neighbor cells.

39. The user equipment to claim 37, further comprising an acquiring circuit configured to acquire an SFN of at least the reference cell or of at least one neighbor cell comprised in the group, and wherein the performing circuit is configured to use the acquired SFN when performing the at least one positioning measurement.

40. The user equipment according to claim 37, wherein more than one reference cell of the plurality of reference cells are associated with one carrier frequency.

* * * * *

UNITED STATES PATENT AND TRADEMARK OFFICE
CERTIFICATE OF CORRECTION

PATENT NO. : 8,903,415 B2  
APPLICATION NO. : 13/321926  
DATED : December 2, 2014  
INVENTOR(S) : Kazmi et al.

Page 1 of 1

It is certified that error appears in the above-identified patent and that said Letters Patent is hereby corrected as shown below:

In the Specification

In Column 7, Line 54, delete "Arrivial," and insert -- Arrival, --, therefor.

In Column 12, Line 21, delete "cell fl." and insert -- cell fl. --, therefor.

In Column 14, Line 25, delete "earfnc." and insert -- earfcn. --, therefor.

In Column 15, Line 30, delete "request" and insert -- request. --, therefor.

In the Claims

In Column 26, Line 21, in Claim 23, delete "equipment to claim" and insert -- equipment according to claim --, therefor.

In Column 26, Line 25, in Claim 24, delete "equipment to claim" and insert -- equipment according to claim --, therefor.

In Column 26, Line 30, in Claim 25, delete "equipment to claim" and insert -- equipment according to claim --, therefor.

In Column 27, Line 22, in Claim 31, delete "equipment to claim" and insert -- equipment according to claim --, therefor.

In Column 28, Line 7, in Claim 35, delete "equipment to claim" and insert -- equipment according to claim --, therefor.

In Column 28, Line 57, in Claim 39, delete "equipment to claim" and insert -- equipment according to claim --, therefor.

Signed and Sealed this  
Twenty-third Day of February, 2016

Michelle K. Lee  
*Director of the United States Patent and Trademark Office*